United States Patent [19]

Pavlik et al.

[11] Patent Number: 4,629,067
[45] Date of Patent: Dec. 16, 1986

[54] DISKETTE HOLDER

[76] Inventors: Patrick C. Pavlik; V. Matthew Pavlik; Myrna L. Pavlik, all of 570 Westvale Drive, Waterloo, Ontario, Canada, N2T 1K4

[21] Appl. No.: 743,495

[22] Filed: Jun. 11, 1985

[51] Int. Cl.$^4$ ............................................. B65D 85/30
[52] U.S. Cl. .................................... 206/425; 206/444; 206/564; 211/40; 211/41; 220/22; 312/183
[58] Field of Search .............. 206/309, 425, 444, 564, 206/445; 211/40, 41; 220/22, 22.1, 22.2, 22.3; 312/183, 185, 187, 193

[56] References Cited

U.S. PATENT DOCUMENTS

| | | | |
|---|---|---|---|
| 2,665,808 | 1/1954 | McAlister | 206/425 |
| 3,897,871 | 8/1975 | Zinnbauer | 211/40 |
| 4,164,309 | 8/1979 | Staats | 206/425 |
| 4,212,401 | 7/1980 | Schweizer | 206/45.18 |
| 4,312,548 | 1/1982 | Posso | 312/183 |
| 4,544,213 | 10/1985 | Long et al. | 312/183 |

FOREIGN PATENT DOCUMENTS

| | | | |
|---|---|---|---|
| 0037326 | 2/1926 | Australia | 211/41 |
| 0214414 | 4/1941 | Switzerland | 220/22.3 |
| 0262708 | 10/1949 | Switzerland | 206/564 |
| 0614981 | 12/1948 | United Kingdom | 220/22.3 |

Primary Examiner—William Price
Assistant Examiner—Jimmy G. Foster
Attorney, Agent, or Firm—R. Craig Armstong

[57] ABSTRACT

A diskette holder for rigid-case data diskettes is disclosed, comprising a platform having a plurality of lateral grooves in the upper surface thereof for receiving diskettes. Associated with each groove are diskette support means comprising a front support face angled upwardly and forwardly from the area of the groove and a rear support face angled upwardly and rearwardly from the area of the groove. At least one support face of a pair associated with a groove has the undercut portion disposed from the plane of the opposing support face by a distance not less than and substantially equal to the thickness of the diskette to be held, and preferably parallel to the opposing support face. In the preferred embodiment, the diskette support means are positioned at only one end of each groove and successively alternating grooves have the support means at alternating ends of the grooves. Stop means at opposite ends of the grooves position the diskettes laterally and preventing lateral movement. The stop means at the groove end remote from the end having the support means comprises the side of a support block comprising the support means associated with the adjacent grooves.

12 Claims, 4 Drawing Figures

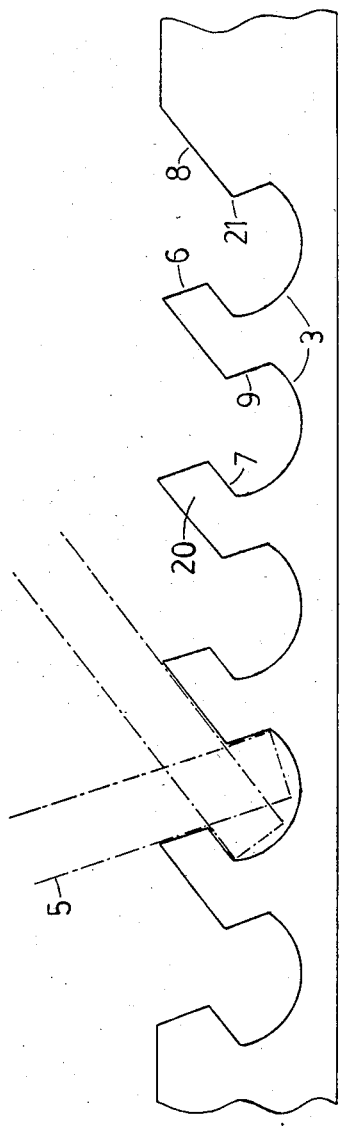

DISKETTE HOLDER

BACKGROUND OF THE INVENTION

1. Field of the Invention

This invention relates to a holder for rigid-case data diskettes such as, for example, the 3½ inch rigid-case diskettes now in use with the Apple Macintosh (trademark) computer.

2. Description of the Prior Art

In the prior art relating to data diskette storage, designs for diskette holders were restricted by the fact that the conventional diskettes were flexible, and thus could not be supported in cantilever fashion along an edge or from a corner without the possibility of damaging the recording medium. With the advent of rigid-case diskettes, existing designs for diskette holders were adapted, with apparently little thought being given to alternative methods of support of the diskettes within the holders. The present inventors have discovered that it is advantageous to resort to a new form of diskette holder which takes advantage of the rigid character of the protective cases of the new diskettes.

SUMMARY OF THE INVENTION

It is an object of the invention to provide a diskette holder which conveniently holds a number of rigid-case data diskettes for storage and display and for rapid and simple handling.

It is a further object of the invention to provide a diskette holder which conveniently provides for the insertion and removal of diskettes.

Thus in accordance with the present invention there is provided a holder for rigid-case diskettes, comprising a platform having a plurality of lateral grooves in the upper surface thereof for receiving diskettes. Diskette support means associated with each groove are attached to or integral with the platform. The diskette support means comprises a front support face angled upwardly and forwardly from the area of the groove and an opposing rear support face angled upwardly and rearwardly from the area of the groove. At least one support face of a pair associated with a groove has an undercut portion disposed from the plane of the opposing support face by a distance not less than and substantially equal to the thickness of the diskette to be held, in order to engage the diskette between the undercut portion and the opposing support face. Diskettes may be thus held at either a forward angle against the front support face or a rearward angle against the rear support face and may be freely rotated therebetween as desired.

In accordance with features of the preferred embodiment of the invention, each support face has an undercut portion as described in the above paragraph, and each undercut portion is substantially parallel to the opposing support face.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 4 is a side or elevation view of an alternative embodiment.

DETAILED DESCRIPTION OF THE PREFERRED EMBODIMENT

Figure 1:
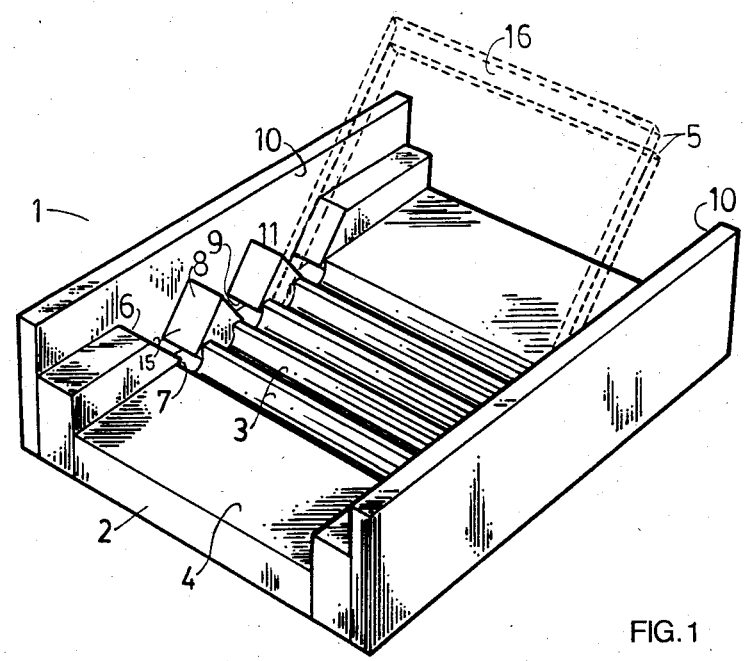
FIG. 1 is a perspective of the preferred embodiment of the diskette holder.
Figure 2:
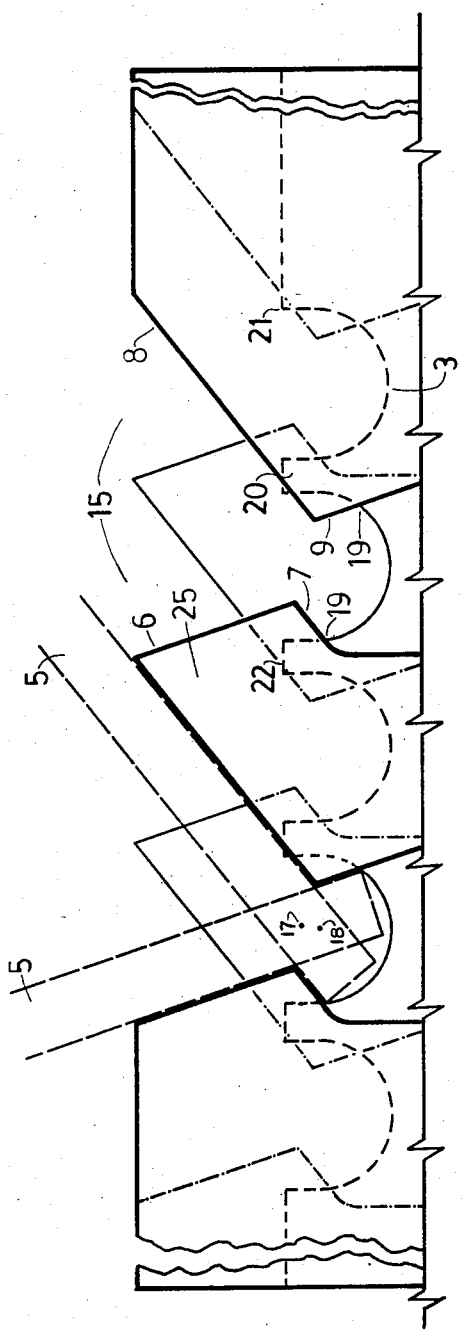
FIG. 2 is a side or elevation view of the preferred embodiment.

Referring first to FIGS. 1 and 2, there is illustrated the preferred embodiment of the diskette holder 1, comprising a platform 2 having a plurality of lateral grooves 3 in the upper surface 4 thereof for receiving rigid-case diskettes 5. The grooves open upwardly, and preferably have bottoms which are semi-circular in cross-section. Diskette support means 15 are associated with each groove 3, attached to or preferably integral with the platform 2. The diskette support means 15 associated with each groove consists of a front support face 6 angled upwardly and forwardly from the area of the groove and a rear support face 8 angled upwardly and rearwardly from the area of the groove. A number of support blocks 25 are thus defined, each comprising a rear support face 8 and, to the rear thereof, a front support face 6. As can be seen most clearly in FIG. 2, the front support face 6 has an undercut portion 7, which in the preferred embodiment is substantially parallel to the plane of the rear support face 8 and disposed therefrom by a distance not less than and substantially equal to the thickness of the diskette to be held. Similarly, the rear support face 8 has an undercut portion 9, which is substantially parallel to the plane of the front support face 6 and disposed therefrom by a distance not less than and substantially equal to the diskette thickness. It should be appreciated that these undercut portions need not necessarily be parallel to the support faces, although it is preferable that that be the case. Thus a diskette 5 placed in a groove may be engaged between either support face 6 or 8 and the undercut portion of the opposing support face, for support either against the front support face 6 at a forward angle when the diskettes are flipped forward for selection, or against the rear support face 8 at a rearward angle for display and normal storage of the diskettes. The diskettes are free to rotate between the forward and rearward angle positions as desired, riding on the bottom of the grooves 3.

As will likely be clear to the reader, "front" and "rear" in the context of this specification are not critical terms, since the diskette holder can if desired be constructed with front and rear symmetry, i.e. symmetry about a lateral axis. However, in the preferred embodiment, the "rear" support face will usually be constructed at a greater angle from the vertical than the angle of the "front" support face, so that diskettes positioned in the rearward angle or storage position slope away from the front at such an angle that a diskette identification information strip 16 at the top of each diskette is visible, as will be explained in greater detail herein. The term "front" also relates to the usual position of the user of the diskette holder.

For simplicity of illustration, the accompanying drawings show only five grooves 3. However, it should be obvious that a much larger number of grooves could be used, such as twenty for example, and indeed that is the intention for the commercialization of the present invention.

Figure 3:
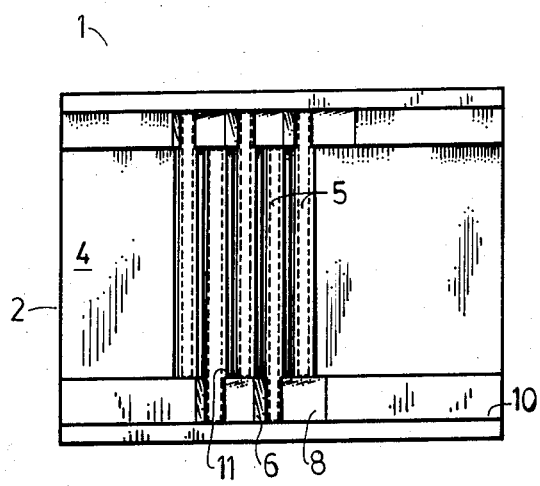
FIG. 3 is a top view of the preferred embodiment.

In the preferred embodiment, the diskette support means 15 for each groove, i.e. the front and rear support faces 6 and 8 and their undercut surfaces 7 and 9, are positioned at one end of each groove 3. The end of the groove at which the support means 15 is located, and hence the location of each support block 25 as well, alternates with each successive groove, as seen in FIGS. 1 and 3, enabling a greater storage density to be achieved. Each support block 25 comprises a rear support face 8, and to the rear thereof, a front support face 6, and the grooves 3 to which these support faces relate are two apart, i.e. they have one groove 3 between them. Obviously, this is not an essential feature, but it clearly is an advantageous arrangement. Stop means, such as the sidewalls 10, are provided for positioning the diskettes laterally and preventing lateral movement thereof. The stop means for each groove in the preferred embodiment consists of the sidewall 10 at the side at which the support means 15 is located, and at the other side, the vertical inner face 11 of the support block 25 between the adjacent grooves. One result of such a layout is that successive diskettes are laterally offset from each other in alternating fashion by the width of the diskette support means 15, i.e. the width of the support faces 6 and 8, or in other words, by the width of the support blocks 25. This has the added advantage of making it easier to insert, select and remove diskettes, because there is good access to the lateral edges of the diskettes 5.

The preferred positioning of the front and rear support faces with respect to the grooves will now be described in greater detail, with particular reference to FIG. 2. The front and rear support faces 6 and 8 respectively are positioned with respect to the grooves 3 so that the primary pivot point 17 for the diskettes 5 is substantially aligned with and slightly above the center 18 of the groove-bottom radius. Being above the center of the groove-bottom radius results in the corners of the diskettes being able to lodge right in the corners 19 defined by the intersections between the support faces and the grooves, so that optimum use is made of the surface area of the undercut portions 7 and 9. As was previously stated, the bottoms of the grooves 3 preferably are in essence semi-circular in cross-section. Preferably, the groove walls extend upwardly from the semi-circular bottom portion of the grooves to provide greater support for the diskettes. The height of this groove wall extension 20 is preferably such that the rear edge 21 of the groove aligns with the rear support face 8 to provide extra support for the diskette 5. The front edge 26 rises to the same or about the same height to aid in ensuring proper diskette alignment during handling and storage, by limiting any tendency which might exist for the diskette to pop out of the groove. The top surface 22 of the groove wall extension 20 could be angled so that the whole top surface 22 aligns with the rear support face 8. The groove wall extension 20 could even be extended rearward to match the shape of the front support face 6 and undercut portion 7 thereof associated with the rearwardly adjacent groove, and could be extended forward to match the shape of the rear support face 8 and undercut portion 9 thereof associated with the forwardly adjacent groove, which would result in the alternative embodiment illustrated in FIG. 4.

The support means 15 extends upwardly a reasonable distance, for example approximately 14 millimeters above the groove bottom for the angles described for the preferred embodiment, to provide adequate lengths of the front and rear support faces 6 and 8 to support the diskette 5 without undue stress. The support means 15 preferably should not extend too high, however, or the spacing between grooves must be made undesireably large, reducing the diskette storage capacity of the holder.

The groove spacing and rear support face angle are preferably selected so that when diskettes 5 are positioned against the rear support face 8 for display, enough of each diskette is left uncovered by the diskette in front of it to make a diskette identification information strip 16 at the top of each diskette readily visible from the front, thereby facilitating diskette selection. For example, a groove spacing of approximately 9.5 millimeters and a rear support face angle of 50 degrees from the vertical has been found to be effective, resulting in a visible diskette identification information strip 16 of about 7 millimeters in height. However, a lesser angle would be sufficient, depending on the groove spacing and depending of course on how large a visible identification information strip 16 was desired. It will of course be appreciated that the groove spacing and rearward angle are by no means critical if visibility of a diskette labelling strip 16 is not considered essential. In that case, any rearward angle which was sufficient to avoid having the diskette accidentally fall forward to the forward angle position would be sufficient.

The front support face angle is also not critical, but is merely sufficient to ensure that the diskettes, once flipped forward, do not accidentally fall back into the normal rearward angle position. An angle of 20 degrees from the vertical has been found to be suitable, for example.

The basic dimensions of the preferred embodiment are as follows, provided by way of example but in no way intended to limit the scope of the invention to diskette holders of these dimensions or proportions. The groove spacing is approximately 9.5 millimeters. The grooves 3 have a bottom radius of typically 3.75 millimeters. The front support face 6 is angled at approximately 20 degrees from the vertical. The rear support face 8 is angled at approximately 50 degrees from the vertical. The support faces extend upwardly approximately 14 millimeters above the groove bottom in order to provide a suitably large front and rear support faces 6 and 8, this dimension being determined by the groove spacing and the front and rear support face angles. The undercut portions 7 and 9 are disposed from their opposite support faces by about 3.5 millimeters, i.e. by a distance not less than and preferably minimally greater than the diskette thickness. The support faces 6 and 8 are approximately 12.5 millimeters wide, resulting in a corresponding lateral offset of 12.5 millimeters between alternating diskettes.

It will be appreciated that the above description relates to the preferred and alternative embodiments by way of example only. Many variations on the invention will be obvious to those knowledgeable in the field, and such obvious variations are within the scope of the invention as described and claimed, whether or not expressly described.

For example, the angles of the support faces are not critical. Both could be at a steep angle, both could be at a shallow angle, or one could be at a steep angle and the other at a shallow angle. The choice of angle of course affects such things as the storage capacity of the diskette holder, the visibility of the diskette identification information strip 16, and the height of the support blocks 25 for given support face surface areas.

As another example, the support means 15 could be integral with the grooves 3 and could extend across the diskette holder. Such an embodiment would provide good support for each diskette, but would have only half the storage capacity of the preferred embodiment for any given support face angles and support face dimensions corresponding to those of the preferred embodiment, because there would be no alternating of support means from side to side to permit "double capacity" storage. The capacity of the preferred embodiment could of course be matched by reducing the support face dimensions and/or by reducing the angles of the support faces from the vertical.

Furthermore, it should be apparent that the grooves 3 need not necessarily have semi-circular bottoms, although the semi-circular shape provides for smoother operation than would be the case with other shapes.

Yet another possible variation would be to omit one or even both of the undercut portions 7 and 9, which could be done if the groove sides were sufficiently high and if the selected support face angles were not too great.

What is claimed as the invention is:

1. A holder for rigid-case diskettes, comprising a platform having a plurality of lateral grooves in the upper surface thereof for receiving diskettes, and diskette support means associated with each said groove attached to or integral with said platform, said diskette support means comprising a front support face angled upwardly and forwardly from the area of the groove and an opposing rear support face angled upwardly and rearwardly from the area of the groove, at least one support face of a pair associated with a groove having an undercut portion disposed from the plane of the opposing support face by a distance not less than and substantially equal to the thickness of the diskette to be held for engaging said diskette between said undercut portion and said opposing support face, whereby diskettes may be held at either a forward angle against said front support face or a rearward angle against said rear support face and may be freely rotated therebetween as desired; and in which each said undercut portion is substantially parallel to the opposing support face.

2. A diskette holder as recited in claim 1, in which said rear support face is inclined at an angle of approximately 50 degrees from the vertical.

3. A holder for rigid-case diskettes, comprising a platform having a plurality of lateral grooves in the upper surface thereof for receiving diskettes, and diskette support means associated with each said groove attached to or integral with said platform, said diskette support means comprising a front support face angled upwardly and forwardly from the area of the groove and an opposing rear support face angled upwardly and rearwardly from the area of the groove, at least one support face of a pair associated with a groove having an undercut portion disposed from the plane of the opposing support face by a distance not less than and substantially equal to the thickness of the diskette to be held for engaging said diskette between said undercut portion and said opposing support face, whereby diskettes may be held at either a forward angle against said front support face or a rearward angle against said rear support face and may be freely rotated therebetween as desired; and in which said diskette support means are positioned at only one end of each groove and in which successive grooves have said support means at alternating ends of said grooves, and further comprising stop means at opposite ends of said grooves for positioning said diskettes laterally and preventing lateral movement thereof, said stop means at the groove end remote from the end having the support means comprising a support block comprising the support means associated with the adjacent grooves.

4. A diskette holder as recited in claim 3, in which each said undercut portion is substantially parallel to the opposing support face.

5. A diskette holder as recited in claim 4, in which said rear support face is inclined at an angle of approximately 50 degrees from the vertical.

6. A diskette holder as recited in claim 3, in which said rear support face is inclined at an angle of approximately 50 degrees from the vertical.

7. A holder for rigid-case diskettes, comprising a platform having a plurality of lateral grooves in the upper surface thereof for receiving diskettes, and diskette support means associated with each said groove attached to or integral with said platform, said diskette support means comprising a front support face angled upwardly and forwardly from the area of the groove and an opposing rear support face angled upwardly and rearwardly from the area of the groove, each support face of a pair associated with a groove having an undercut portion disposed from the plane of the opposing support face by a distance not less than and substantially equal to the thickness of the diskette to be held, whereby a diskette placed in a groove may be engaged between either support face and the undercut portion of the opposing support face, for engagement at either a forward angle against said front support face or a rearward angle against said rear support face and for free rotation therebetween as desired; and in which said diskette support means are positioned at only one end of each groove and in which successive grooves have said support means at alternating ends of said grooves, and further comprising stop means at opposite ends of said grooves for positioning said diskettes laterally and preventing lateral movement thereof, said stop means at the groove end remote from the end having the support means comprising a support block comprising the support means associated with the adjacent grooves.

8. A diskette holder as recited in claim 7, in which each said undercut portion is substantially parallel to the opposing support face.

9. A diskette holder as recited in claim 8, in which said rear support face is inclined at an angle of approximately 50 degrees from the vertical.

10. A diskette holder as recited in claim 7, in which said rear support face is inclined at an angle of approximately 50 degrees from the vertical.

11. A holder for rigid-case diskettes, comprising a platform having a plurality of lateral grooves in the upper surface thereof for receiving diskettes, and diskette support means associated with each said groove attached to or integral with said platform, said diskette support means comprising a front support face angled upwardly and forwardly from the area of the groove and an opposing rear support face angled upwardly and rearwardly from the area of the groove, each support face of a pair associated with a groove having an undercut portion disposed from the plane of the opposing support face by a distance not less than and substantially equal to the thickness of the diskette to be held, whereby a diskette placed in a groove may be engaged between either support face and the undercut portion of the opposing support face, for engagement at either a forward angle against said front support face or a rearward angle against said rear support face and for free rotation therebetween as desired; and in which each said undercut portion is substantially parallel to the opposing support face.

12. A diskette holder as recited in claim 11, in which said rear support face is inclined at an angle of approximately 50 degrees from the vertical.

* * * * *